United States Patent [19]

Mathis

[11] Patent Number: 5,111,519

[45] Date of Patent: May 5, 1992

[54] METHOD OF INTERFERENCE REDUCTION FOR FREQUENCY MULTIPLEXED OPTICAL FIBER COMMUNICATION

[75] Inventor: Ronald F. Mathis, Ramona, Calif.

[73] Assignee: Tacan Corporation, Carlsbad, Calif.

[21] Appl. No.: 649,745

[22] Filed: Feb. 1, 1991

[51] Int. Cl.⁵ .......................... G02B 6/28; H04J 1/00; G02F 1/00

[52] U.S. Cl. ......................................... 385/24; 385/47; 385/49; 385/131; 385/140; 359/124; 359/157; 359/170; 359/173; 359/193; 359/195

[58] Field of Search ............... 350/96.11, 96.12, 96.13, 350/96.14, 96.15, 96.16, 96.29, 96.30; 370/1, 3; 455/602, 610, 612; 385/24, 45, 47, 89, 49, 131, 132, 140; 359/123, 124, 157, 170, 173, 193, 195

[56] References Cited

U.S. PATENT DOCUMENTS

| | | | |
|---|---|---|---|
| 4,358,851 | 11/1982 | Scifres et al. | 350/96.18 |
| 4,577,924 | 3/1986 | Mathis | 350/96.15 |
| 4,720,160 | 1/1988 | Hicks, Jr. | 350/96.15 |
| 4,726,644 | 2/1988 | Mathis | 350/96.16 |
| 4,768,849 | 9/1988 | Hicks, Jr. | 350/96.15 |
| 4,790,615 | 12/1988 | Seki et al. | 350/96.12 |
| 4,900,116 | 2/1990 | Mathis | 350/96.15 |
| 4,910,539 | 3/1990 | Mathis et al. | 350/96.15 |
| 5,002,352 | 3/1991 | Bradley et al. | 350/96.12 |

Primary Examiner—Brian Healy
Attorney, Agent, or Firm—Brown, Martin, Haller & McClain

[57] ABSTRACT

A fiber-optic bandpass filter comprising a resonant cavity formed in an optical waveguide is coupled to a fiber-optic bus which carries a large number of frequency multiplexed channels. The fiber-optic bandpass filter is selected to be one-half the modulation wavelength of the desired center frequency within a range of frequencies carried on the same transmission. The creation of a resonant cavity at the desired center frequency provides a filter which reduces the intensity of signals at surrounding frequencies so that an overall reduced output power is provided, resulting in less cross-talk between a large number of frequency multiplexed signals which, unfiltered, would all have equal power. The filter is broad enough that many adjacent channels are not significantly attenuated. The optical waveguide of which the filter is formed may be in the form of an optical fiber segment or a planar waveguide.

5 Claims, 2 Drawing Sheets

METHOD OF INTERFERENCE REDUCTION FOR FREQUENCY MULTIPLEXED OPTICAL FIBER COMMUNICATION

BACKGROUND OF THE INVENTION

Optical communication networks may carry both digital and analog transmissions. Digital transmission is more commonly used simply because it is the more widely known and understood method of transmission. It is used extensively for wavelength division multiplexing (WDM) and time division multiplexing (TDM). However, there are several applications where a signal to be transmitted from one point to another cannot conveniently and economically be converted to digital form. For example, in telephone transmissions, an FDM (frequency division multiplexing) master group of 600 4-kHz voice channels is stacked in frequency from 60 to 2788 kHz. While such a signal could be sampled and encoded into a binary signal, the linearity and fidelity requirements on the coding and decoding in order to prevent cross-talk between the channels are extremely restrictive. Other applications where analog transmission is preferred are video and CATV signals where the cost of digital coders and decoders are prohibitive.

In order to detect an analog signal the detector must be relatively sensitive, having a good signal-to-noise ratio (SNR). The SNR for the receiver decreases as the receiver bandwidth increases. In order to accommodate a large number of signals a large bandwidth is required, thus decreasing SNR and increasing the total optical power received, creating a risk of detector saturation and nonlinear distortion. Further, the probability of error increases due to the interference caused by vector addition of various signals at the detector.

It is known that optical bandpass filters can be fabricated from optical fibers (U.S. Pat. No. 4,577,924, commonly owned and issued to this Applicant) and from planar waveguides (U.S. Pat. No. 5,002,352, commonly owned of which this Applicant is a co-inventor). Optical bandpass filters so fabricated create a resonant cavity which is resonant at a desired frequency and, thus, reduces or filters out other frequencies. Such filters are relatively easy to fabricate and provide other benefits including reduced size, weight and cost, and reduced sensitivity to electromagnetic interference as compared with other types of filters.

It would be desirable to provide a means for controlling FDM optical signals which would permit an increase in the bandwidth to accommodate more analog signals while improving the SNR of the detector to provide greater sensitivity and low error rate. It would be further desirable to provide such a filtering means using relatively simple devices which are readily fabricated. It is an object of the present invention to provide such means.

SUMMARY OF THE INVENTION

It is an advantage of the present invention to provide a means for reducing self interference between frequency multiplexed channels on a fiber-optic bus.

It is a further advantage of the present invention to reduce the dynamic range requirements of a detector preamplifier, thus improving signal-to-noise ratio.

In an exemplary embodiment, a fiber optic bandpass filter comprising a resonant cavity formed in an optical waveguide is coupled to a fiber-optic bus which carries a large number of frequency multiplexed channels. The fiber-optic bandpass filter is selected to be one-half the modulation wavelength of the desired center frequency within a range of frequencies carried on the same transmission. The creation of a resonant cavity at the desired center frequency provides a filter which reduces the intensity of signals at surrounding frequencies so that an overall reduced output power is provided, resulting in less cross-talk between a large number of frequency multiplexed signals which, unfiltered, would all have equal power.

Where a large number of channels is present in the transmission, multiple filters may be used to cover all the channels. For example, for a transmission carrying 300 channels, three filters may be used to divide the transmission into three bands, each one covering 100 channels. The center frequency of each band would be the 50th channel going from the lowest to the highest, with the output power of channels 1-49 and 51-100 decreasing as the distance from the 50th channel increases.

The filter is broad enough that many adjacent channels are not significantly attenuated. For example, if 90 of the 100 channels are down by at least 20 dB, the peak signal voltage for the desired channels will be only ten times that of a single channel plus much smaller contributions from the 90 channels. This represents a 14 dB improvement in peak voltage at the detector over the unfiltered condition. The dynamic range requirement of the detector preamplifier is significantly reduced because of the decreased risk of saturation and distortion, which in turn provides a better signal-to-noise ratio. Following this example, the rms voltage is reduced by $-7$ dB, which in turn reduces cross-talk between the channels by more than 21 dB.

The optical waveguide of which the filter is formed may be in the form of an optical fiber segment or a planar waveguide. The optical fiber segment is formed to be one-half the modulation wavelength with high reflectance mirrors on both ends. Openings are provided for input of incoming light and output of filtered light. The input opening may be located at the first mirror, or in the side of the fiber perpendicular to its axis via a directional coupler. The exit opening is located in the second mirror.

The planar waveguide configuration is created by depositing a plurality of dielectric layers on a substrate to provide a core sandwiched between lower and upper cladding layers. The core layer is at least 20 microns thick to minimize absorption and scattering. The advantage of a planar waveguide configuration is that multiple waveguides of different lengths may be formed on a single substrate so that a large number of channels can be filtered by dividing the transmission into multiple bands. Where optical fibers are used it may be more difficult to split the transmission uniformly because of the difficulty in aligning a number of fiber segments.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENT

Figure 1:
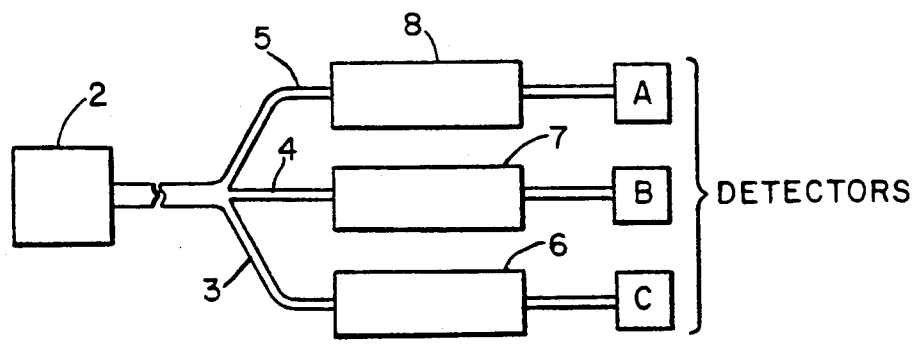
FIG. 1 is a diagrammatic view of a device for filtering a transmission with three optical bandpass filters.

As shown in FIG. 1, a signal transmitted through an optical communication network 2 is divided into three different optical fibers 3, 4 and 5, each fiber receiving the full range of channels carried by the transmission. Each fiber has an optical bandpass filter 6, 7 and 8, respectively, each of which has a different length according to the center frequency of the desired band to be filtered. The three different optical bandpass filters are designed to accommodate a band comprising one-third of the channels carried by the transmission. The length of each filter is determined to be one-half the modulation wavelength of the center frequency of the band to be filtered. For example, for filter 6, the center frequency may be chosen to be 200 MHz, so the length of the filter will be one-half of the modulation wavelength 200 MHz and the band filtered by this filter will cover the range of 100 MHz to 300 MHz.

Filter 7 may be chosen with a center frequency of 400 MHz, covering the range of 300 MHz to 500 MHz, and filter 8 may be chosen with a center frequency of 600 MHz, covering the range of 500 MHz to 700 MHz. The total transmission carries signals from 100 MHz to 700 MHz. If the transmission carries 150 channels each band will consist of 50 channels, with the channels being at 400 MHz intervals.

Figure 2:
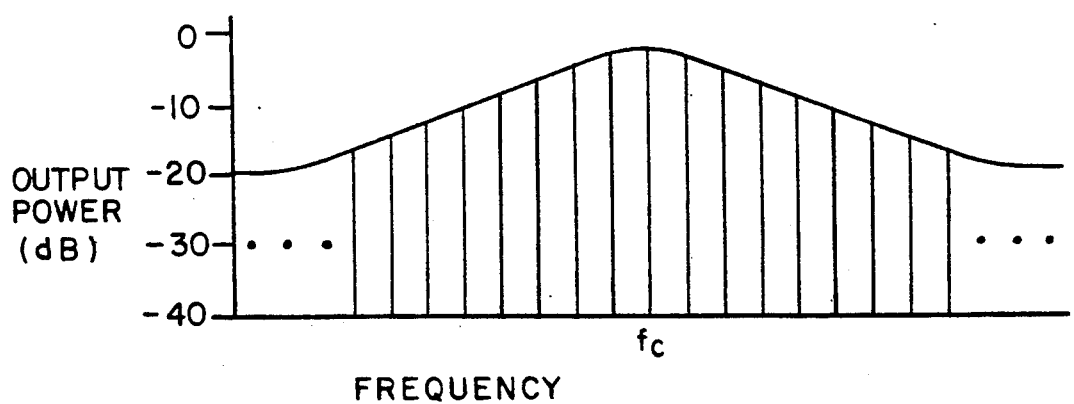
FIG. 2 is a graph of frequency versus output power for a single optical bandpass filter.
Figure 3:
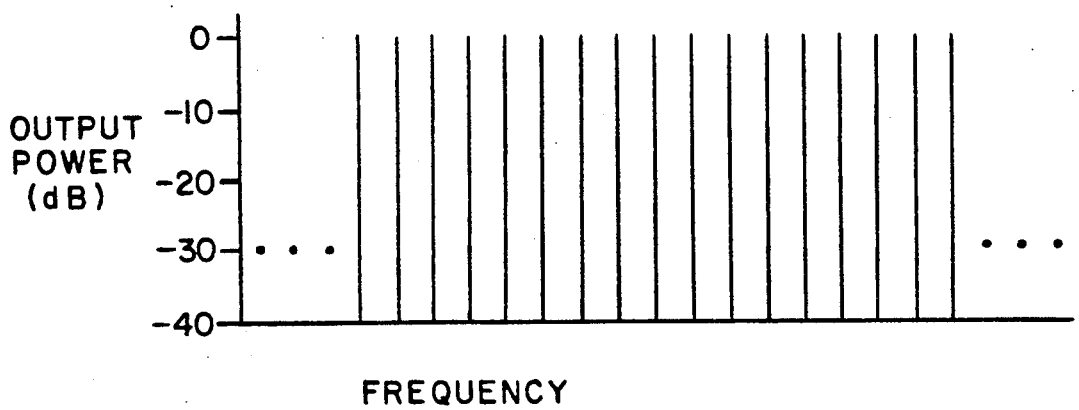
FIG. 3 is a graph of frequency versus output power, unfiltered.
Figure 4:
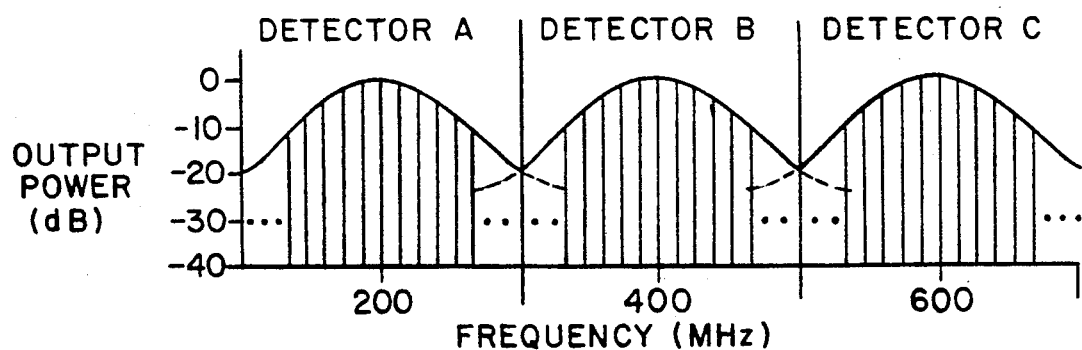
FIG. 4 is a graph of frequency versus output power for the system of FIG. 1.

FIGS. 2–4 illustrate the differences in output power between unfiltered and filtered signals. FIG. 3 is plot of frequency versus output power for an unfiltered network where it can be seen that the output power is the sum of the output powers for all individual channels. In this case, for example, if 100 signals are present, the peak signal amplitude can be as large as 100 times that of an individual channel, resulting in self-interference due to vector addition of the various signals at the detector.

FIG. 2 is a plot of frequency versus output power for a network with a single optical bandpass filter. The length of the filter is one-half the modulation wavelength of the signal with frequency $f_c$, the desired center frequency within the band of signals to be filtered. The filter is broad enough, i.e., the output opening is large enough, to permit a number of channels adjacent to $f_c$ to pass without significant attenuation, producing an output as plotted in FIG. 2. The filtering results in a decrease in the total output power of the detector For example, if 90 of the 100 channels are down by at least 20 dB, the peak signal voltage for the desired channels will be only ten times that of a single channel plus much smaller contributions from the 90 channels. This represents a 14 dB improvement in peak voltage over the unfiltered case. Also, the dynamic range requirements of the detector preamplifier will be significantly reduced, allowing an improvement in the signal-to-noise ratio. With the rms voltage reduced by −7 dB, crosstalk is reduced by more than 21 dB.

FIG. 4 illustrates the output power of a network with three optical filters as shown in FIG. 1. The optical filters are designed for filtering different bands of frequencies within the large number of signals in the transmission. Each filter provides the filtering as illustrated in FIG. 2 over different bands of signals, thus capturing the full frequency band of the signal between the three filters.

Figure 5:
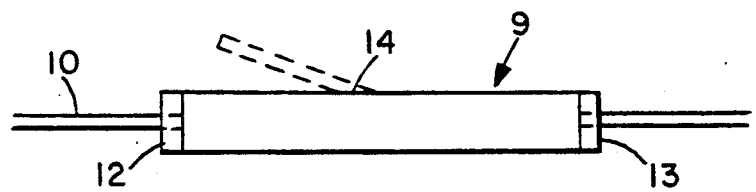
FIG. 5 is a diagrammatic view of a fiber segment optical bandpass filter.

The physical structure of the optical bandpass filter made from an optical fiber, shown in FIG. 5, includes an input fiber 10 inserted into the entrance opening in either the first end 12 of the fiber segment 9 or in an opening in the side 14 of the optical fiber which is mounted into a directional coupler device. A reflective coating is applied by appropriate means such as deposition at the ends 12 and 13 of the fiber after the ends have been ground flat and polished.

The fiber segment 9 has a length corresponding to half of the length of the modulation frequency in that fiber. Light input from the source enters the fiber segment 9 either through the first mirror 14 or through the side 14 by way of the directional coupler and exits through the second mirror 15. By making the length of the fiber equal to half the modulation wavelength, the fiber segment 9 functions as a resonant cavity which is resonant not to the optical carrier but to the modulation on the carrier, i.e., the signal.

Figure 6A:
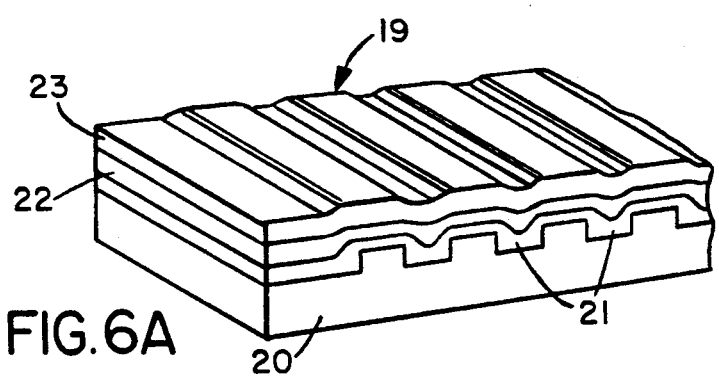
FIGS. 6A, B are diagrammatic views of an array of planar optical bandpass filters.

The planar waveguide 19, shown in FIG. 6A, is formed by patterning and etching a dielectric substrate 20 so that a series of grooves or ridges run coaxially with the light path. A thin film of dielectric is deposited to form a lower cladding 21 over which is deposited a dielectric film to form the core layer 22. The core layer 22 has a higher refractive index than the cladding layer and is greater than 20 microns thick. This thickness is much greater than that used for typical planar waveguides so that scattering losses are reduced. The upper cladding layer 23 is deposited over the core 22, the upper cladding layer having the same refractive index as the lower cladding layer 21.

Figure 6B:
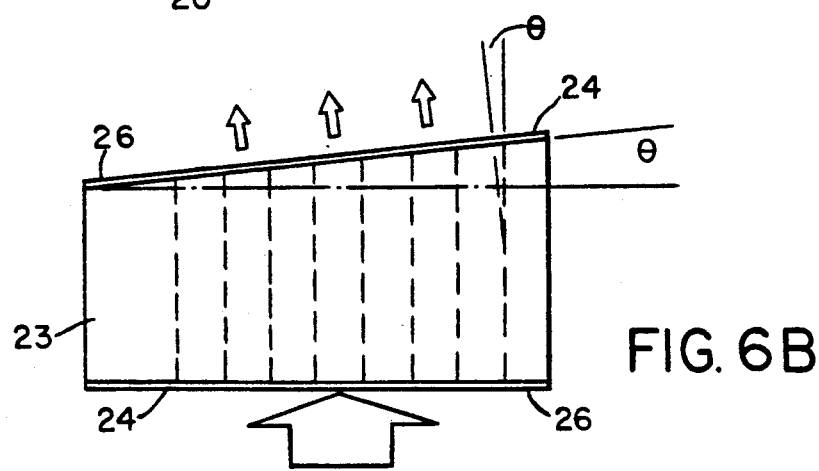

After film deposition, the array of waveguides is cut using a precision saw to expose the ends 23 and 24 of each waveguide. The ends 24 of the waveguides, shown in FIG. 6B, are polished and high-reflectance mirrors 26 are deposited at the ends to form a resonant cavity. In order to fabricate an array of filters with varying center frequencies, the substrate 20 is cut with a slight angle $\theta$, and each waveguide is slightly curved to assure that it meets the angle cut edge perpendicular to the end of the waveguide. The angle cut of the substrate results in the waveguides having different lengths so that optical bandpass filters for different center frequencies will be available on a single substrate. This configuration permits multiple bands to be created within a transmission so that a large number of channels can be transmitted.

The planar configuration may provide a more efficient means of uniformly dividing the incoming light due to the planarity of the waveguides to be used. It may be somewhat more difficult to align an array of discrete fiber segments so that each segment receives an equal amount of light, although once aligned, the discrete fiber segments should be equally effective, if not better, than the planar waveguides for efficiently delivering filtered light.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A method for reducing interference and cross-talk between channels within a signal comprising a plurality of frequency multiplexed channels being transmitted on a fiberoptic bus to a receiver, said method which comprises:

selecting one or more center frequencies within said signal;

forming a resonant cavity from an optical waveguide for each selected center frequency, said resonant cavity being resonant at said selected center frequency;

feeding said signal into each resonant cavity;

attenuating the total power of said channels within a signal received at said receiver by attenuating the frequencies within a range surrounding each center frequency more than said each center frequency.

2. A method as in claim 1 wherein the step of forming a resonant cavity comprises:

selecting a segment of an optical fiber with a length equal to one-half the modulation wavelength of the selected center frequency;

forming a highly reflective mirror on each end of said segment; and providing means for input and output of light.

3. A method as in claim 1 wherein the step of forming a resonant cavity comprises:

depositing a plurality of dielectric layers on a substrate to form an optical waveguide;

defining a length of said optical waveguide to be one-half the modulation wavelength of the selected center frequency;

forming a highly reflective mirror on each end of said optical waveguide; and providing means for input and output of light.

4. A method as in claim 2 or 3 wherein the step of providing output means includes making said output means sufficiently broad to permit a number of frequencies surrounding said selected center frequency to be emitted from said resonant cavity.

5. A method as in claim 1 wherein the step of selecting one or more center frequencies includes selecting center frequencies which are sufficiently close to each other that the sum of the ranges of frequencies surrounding each selected center frequency covers said plurality of frequency multiplexed channels.

* * * * *